US009082042B2

(12) United States Patent
Sethna et al.

(10) Patent No.: US 9,082,042 B2
(45) Date of Patent: Jul. 14, 2015

(54) SYSTEM AND METHOD FOR CLASSIFICATION OF MOVING OBJECT DURING VIDEO SURVEILLANCE

(75) Inventors: Behram Sethna, Mumbai (IN); Mala John, Chennai (IN); Prasath Palaniappan, Chennai (IN); Sumithra Ganapathi, Chennai (IN)

(73) Assignees: TATA CONSULTANCY SERVICES, Mumbai (IN); ANNA UNIVERSITY, Chennai (IN)

( * ) Notice: Subject to any disclaimer, the term of this patent is extended or adjusted under 35 U.S.C. 154(b) by 520 days.

(21) Appl. No.: 13/194,706

(22) Filed: Jul. 29, 2011

(65) Prior Publication Data

US 2012/0026328 A1 Feb. 2, 2012

(30) Foreign Application Priority Data

Jul. 29, 2010 (IN) ........................ 2162/MUM/2010

(51) Int. Cl.
*H04N 7/18* (2006.01)
*H04N 9/47* (2006.01)
*G06K 9/52* (2006.01)

(52) U.S. Cl.
CPC ........................................ *G06K 9/52* (2013.01)

(58) Field of Classification Search
USPC ............................................ 348/143, E7.085
See application file for complete search history.

(56) References Cited

U.S. PATENT DOCUMENTS

| 6,944,527 | B2* | 9/2005 | Dell' Eva et al. ................ 701/45 |
| 7,171,042 | B2* | 1/2007 | Hartmann et al. ............. 382/159 |
| 7,200,266 | B2* | 4/2007 | Ozer et al. ..................... 382/173 |
| 7,391,907 | B1* | 6/2008 | Venetianer et al. ........... 382/224 |
| 7,613,324 | B2* | 11/2009 | Venetianer et al. ........... 382/103 |
| 7,639,840 | B2* | 12/2009 | Hanna et al. .................. 382/103 |
| 2005/0031173 | A1* | 2/2005 | Hwang .......................... 382/118 |
| 2006/0018516 | A1* | 1/2006 | Masoud et al. ............... 382/115 |
| 2006/0120609 | A1* | 6/2006 | Ivanov et al. ................. 382/224 |
| 2007/0070190 | A1* | 3/2007 | Yin et al. .......................... 348/36 |
| 2007/0154095 | A1* | 7/2007 | Cao et al. ...................... 382/190 |
| 2007/0154096 | A1* | 7/2007 | Cao et al. ...................... 382/190 |
| 2007/0154100 | A1* | 7/2007 | Au et al. ....................... 382/226 |
| 2007/0201694 | A1* | 8/2007 | Bolle et al. .................... 380/205 |
| 2008/0031493 | A1* | 2/2008 | Brogren et al. ............... 382/103 |
| 2008/0181453 | A1* | 7/2008 | Xu et al. ........................ 382/103 |
| 2009/0041302 | A1* | 2/2009 | Nagaoka et al. .............. 382/103 |
| 2009/0304230 | A1* | 12/2009 | Krahnstoever et al. ....... 382/103 |
| 2009/0316957 | A1* | 12/2009 | Chen et al. .................... 382/104 |

OTHER PUBLICATIONS

Wiki. Wikipedia Article on Variance. Publication date: Apr. 6, 2010. http://web.archive.org/web/20100406133148/http://en.wikipedia.org/wiki/Variance.*
Cutler et al., "Robust Real-Time Periodic Motion Detection, Analysis and Applications," Source : IEEE Transactions on Pattern Analysis and Machine Intelligence archive, vol. 22, Issue 8 (Aug. 2000) Table of Contents, pp. 781-796, Year of Publication: 2000.
Collins, Robert T., "Algorithms for Cooperative Multi Sensor Surveillance," This paper appears in: Proceedings of the IEEE, Issue Date: Oct. 2001, vol. 89, Issue: 10, on pp. 1456-1477.

* cited by examiner

*Primary Examiner* — Christopher S Kelley
*Assistant Examiner* — Ana Picon-Feliciano
(74) *Attorney, Agent, or Firm* — Akerman LLP; Peter A Chiabotti; Roy P. Zachariah (57) ABSTRACT

A system for classifying moving objects during video-based surveillance comprising: capturing a silhouette image of a moving object, resizing the captured image, computing an average height to width ratio and a center of gravity for the object in the resized image, dividing the resized image, comparing the average height to average width of the object and further comparing the variance of center of gravity with a predetermined threshold value to classify the object in the captured silhouette into predetermined classes.

22 Claims, 12 Drawing Sheets

SYSTEM AND METHOD FOR CLASSIFICATION OF MOVING OBJECT DURING VIDEO SURVEILLANCE

CROSS-REFERENCE TO RELATED APPLICATIONS AND PRIORITY

The present application claims priority to Indian Patent Application No. 2162/MUM/2010, filed on Jul. 29, 2010, the entirety of which is hereby incorporated by reference.

FIELD OF THE INVENTION

The present invention relates to a system and method for video surveillance. More particularly, the invention relates to a system and method for classification of moving object during the video surveillance.

BACKGROUND

It is quite strenuous to have manual surveillance around the clock in sensitive areas. Even with video cameras fitted in most of the places where security is a concern, the volume of the data generated by video is so enormous that it might demand prohibitively large data storage requirements.

The word surveillance may be applied to observation from a distance by means of electronic equipment such as CCTV cameras. Surveillance is useful to private and government security agencies to maintain social control, recognize and monitor threats, and prevent/investigate, trespassing and criminal activities. The video surveillance is literally used everywhere including in sensitive areas and like airports, nuclear power plants, laboratories, banks. It is also used at traffic signals, streets, doors etc. Organizations responsible for conducting such surveillance typically deploy a plurality of sensors (e.g., Closed Circuit Television Video (CCTV) and infrared cameras, radars, etc.) to ensure security and wide-area awareness.

In the current state of the art, the classification of the moving object during the video surveillance into predefined classes like human, animal (cattle) and vehicle is done by different processes.

The techniques used in the prior arts like temporal differencing, background subtraction, optical flow, use of motion detection mask, periodic motion and image correlation matching for the classification of the moving object in to predetermined classes are computationally expensive and require more memory space for storing and analyzing sequence of frames in the video containing object of interest.

As compared to the prior arts, the proposed the system and method for classification of moving objects in the video surveillance into predefined classes, using a computationally inexpensive method which is more economic, using simple logic for discriminating objects during video surveillance, utilizing less memory storage space avoiding the storage of frames and utilizing less memory storage space while computing discriminatory feature.

OBJECTIVES

The principle object of the present application is to propose a system and method that can classify any moving object during video surveillance into predefined classes.

Another significant object of the application is to use a simpler logic and computationally economic method for the classification of moving objects during video surveillance.

Another object of the application is to store only the set of center of gravities computed from the sequence of the frames for variance computation thereby requiring lesser memory space.

Yet another object of the application is to provide a system and method for classification of moving objects in the video surveillance which is computationally inexpensive.

SUMMARY

Before the present methods, systems, and hardware enablement are described, it is to be understood that this invention in not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention which will be limited only by the appended claims.

The present invention provides a system for classifying moving objects during video based surveillance comprising:
a) at least one video capturing means configured to capture a silhouette image of a moving object falling within the operating range of video capturing means;
b) a means for storing the program instructions that are configured to cause the processor:
   i) to resize the captured silhouette image, wherein a resizing scale factor of the silhouette image is calculated by using the dimensions of an upper half of the captured silhouette image;
   ii) to compute an average height to width ratio and center of gravity of the object in the resized silhouette image, wherein the center of gravity is calculated by using only the upper half of the object;
   iii) to divide the lower half of the captured image into two parts by a vertical line through the center of gravity and analyze one of the lower half and calculate the variance of center of gravity;
   iv) to compare the average height to average width of the object and further comparing variance of center of gravity with the predetermined threshold value;
   v) to classify the object in the captured silhouette into predetermined classes, wherein the classification is done on the basis of the calculated values of average height, average width and variance of center of gravity.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings example constructions of the invention; however, the invention is not limited to the specific methods and system disclosed.

In the drawings.

DETAILED DESCRIPTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiment is merely exemplary of the invention, which may be embodied in various forms.

Silhouette: is a side view of an object or scene consisting of the outline and a featureless interior, with the silhouetted object.

Center of gravity: The average co-ordinate of the region of interest or the binary image under consideration in the context of image processing.

Surveillance: is the monitoring of the behavior, activities, or other changing information, usually of people and often in a surreptitious manner. It most usually refers to observation of individuals or groups by government organizations, but disease surveillance, for example, is monitoring the progress of a disease in a community.

Video capturing means: is a means for capturing video. It can be a video camera, closed-circuit television (CCTV) camera or IP camera.

Processing system: is the system in accordance with the present invention, wherein each camera has its associated processing system for analysis of a captured image and for classification the moving object coming in the operating range of the video surveillance.

The present invention provides a system for classifying moving objects during video based surveillance comprising:
at least one video capturing means configured to capture a silhouette image of a moving object falling within the operating range of video capturing means;
a means for storing the program instructions that are configured to cause the processor:
to resize the captured silhouette image, wherein resizing scale factor of the silhouette image is calculated by using the dimensions of upper half of the captured silhouette image;
to compute an average height to width ratio and center of gravity of the object in the resized silhouette image, wherein center of gravity is calculated by using only the upper half of the object;
to divide the lower half of the captured image into two parts by a vertical line through the center of gravity and analyze one of the lower half and calculate the variance of center of gravity;
to compare the average height to average width of the object and further comparing variance of center of gravity with the predetermined threshold value;
to classify the object in the captured silhouette into predetermined classes, wherein the classification is done on the basis of the calculated values of average height, average width and variance of center of gravity.

Figure 1:
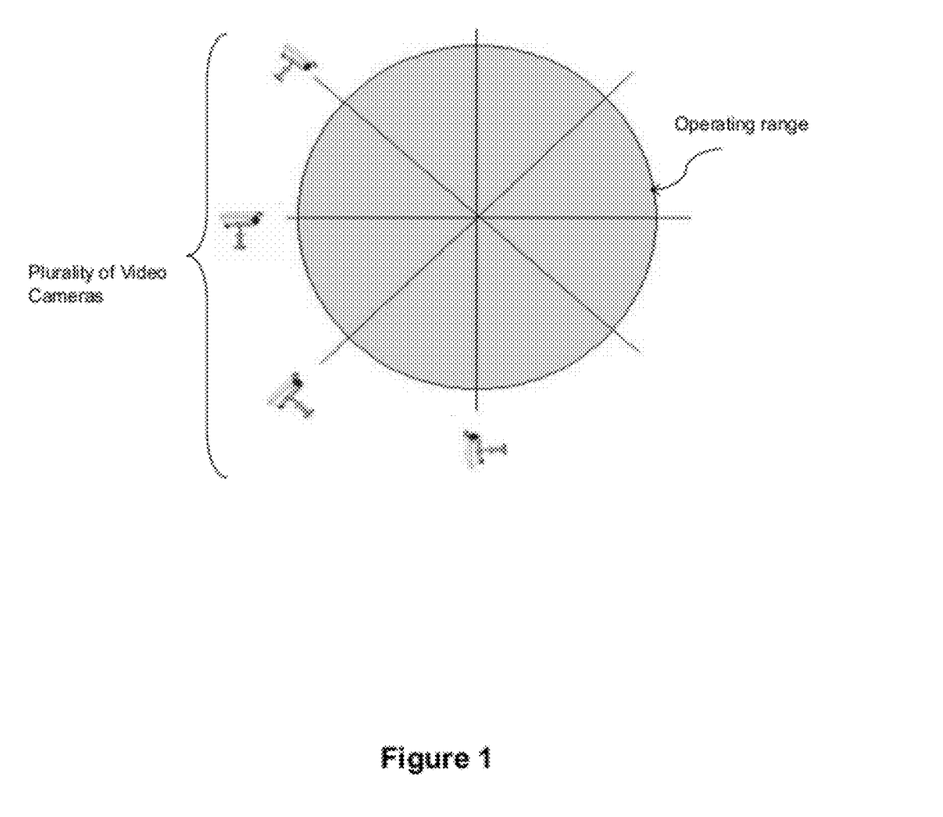
FIG. 1 shows an arrangement of video cameras and their operating range.

In accordance with an exemplary embodiment, at least four video capturing means hereon called as camera placed on the circumference of the area to be covered as shown in FIG. 1 so as to ensure that at least one of the four cameras captures the silhouette of a moving object.

The processing system (not shown) is attached each camera, so as to enable each camera to analyze the captured silhouette image and to classify the moving object falling in the operating range of the video surveillance as shown in FIG. 1, wherein each camera is capable of processing the captured frames independently and aid in the final decision regarding classification of the moving object into predetermined classes like human, cattle and vehicle. Further the system can optionally sound an alarm as and when an object of interest that is a human, vehicle or cattle comes into the field of surveillance.

The processing system can be a specific purpose computer in which a means for storing the program instructions that are configured to cause the processor to perform tasks like: resizing the captured image, computing average height to width ratio and center of gravity for the object in the resized image, and comparing the average height to average width of the object and further comparing variance of center of gravity with the predetermined threshold value to classify the object in the captured silhouette into predetermined classes.

In general, a large memory storage space is required in the video surveillance system. If there is no constraint on memory storage space requirements, complete video recordings of the particular area under surveillance could be stored. However, it is difficult to look through (analyze) the entire recording to retrieve the relevant frames in which the object of interest is captured, in contexts that require analysis of the video sequence, for example, investigation of crimes. The invention presented herein could be used in such scenarios in order to extract those frames that contain objects of interest from the stored video stream.

The system and method proposed herein is meant for classifying the moving object that is being tracked in a video stream.

Figure 3:
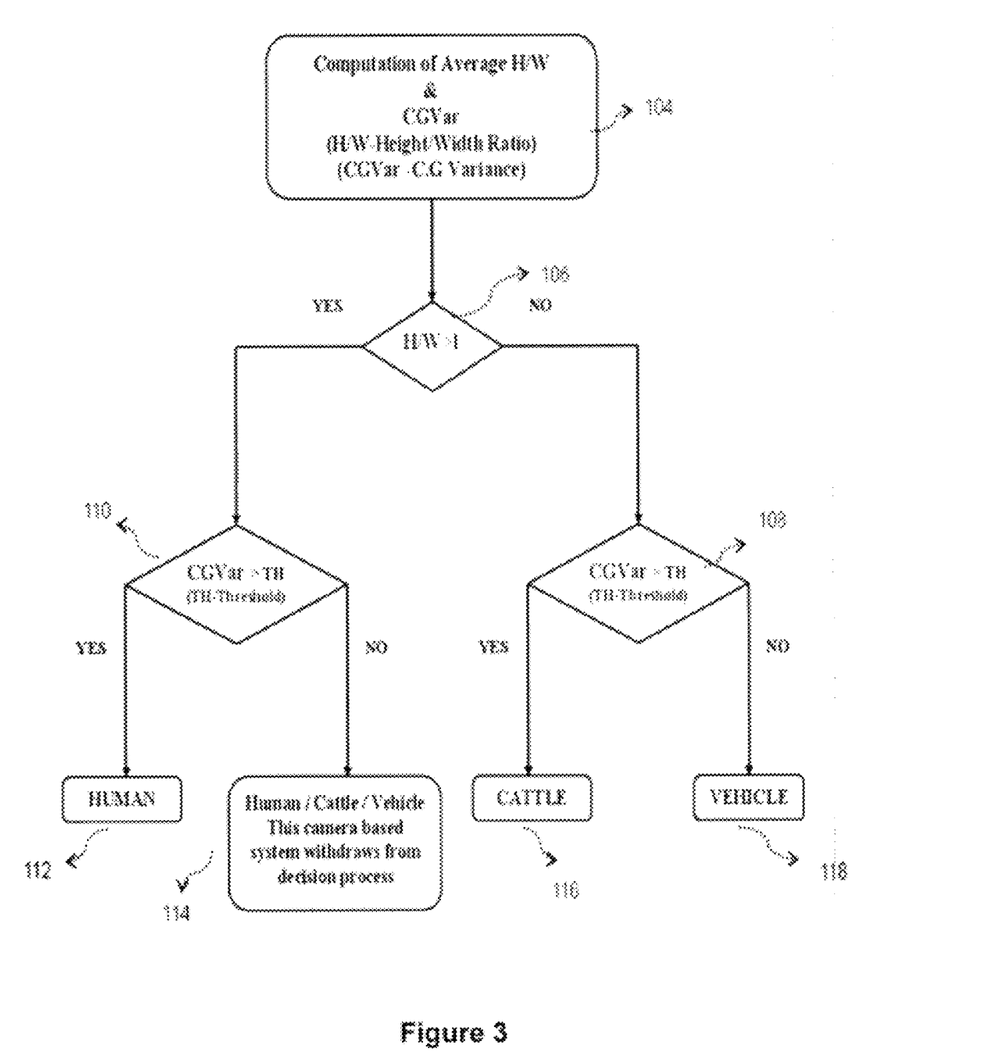
FIG. 3 shows a flowchart for a system and method for classification of moving object during video surveillance into human, cattle and vehicle.

In accordance with FIG. 3, a moving object coming into the operating range of the video surveillance system is tracked. The tracking of the moving object could be carried out using any one of the methods known in the state of art. Each camera in the surveillance system will try to capture a silhouette image of the moving object. As one processing system is connected to each of the four cameras, the four different cameras would extract the same set of parameters of the moving object in operating range.

For the camera which does not manage to capture a silhouette image of the moving object, the processing system associated with that particular camera will automatically withdraw from the decision process. If a human or a cow comes in the field of view, in such a scenario, the silhouette based processing system would participate in the decision process. If a vehicle comes in the field of view both silhouette and non-silhouette based processing systems would participate in the decision process.

Figure 2:
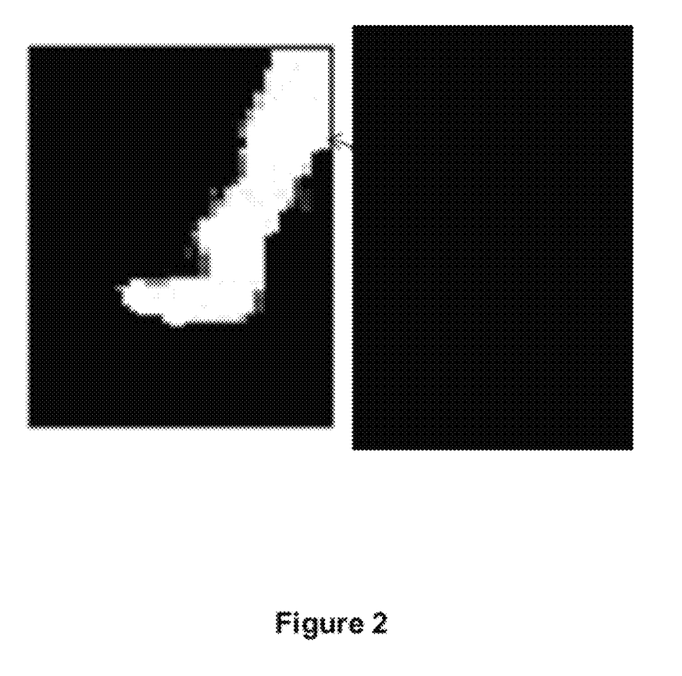
FIG. 2 illustrates the lower left half of a captured silhouette image.

The silhouette image of the moving object captured by at least one camera is divided into two parts namely an upper half and a lower half. The captured silhouette image is resized, wherein a resizing scale factor of the captured silhouette image is calculated by using the dimensions of the upper half of the captured silhouette image. This is to ensure that the movements as reflected in the lower half do not influence the resizing scale. The entire image is resized based on this scale factor. After resizing the captured silhouette image, an average height to width ratio of the object in the resized silhouette image is calculated. Further, the center of gravity of the object in the resized silhouette image is calculated, wherein the center of gravity is calculated by using only the upper half of the object. A vertical line through the center of gravity divides the lower half of the captured image into two parts namely lower left half and lower right half.

The processing system further analyses one of the lower halves and calculates the variance of center of gravity, wherein the variance of center of gravity means the change in position of the part of object in the said lower half of the image with respect to the center of gravity of the said object. The discriminatory information used herein is based on the nature of the oscillation of the center of gravity of the object in the lower left half (LLH). It is sufficient to consider frames typically at a rate 1 frame/sec. The center of gravity of the object in the LLH is computed for particular number of consecutive frames. The mean and variance of the center of gravity (CG) are computed. Due to the swing of the legs exhibited by the nature of human walk, center of gravity variance will be very large. However, for vehicles, the center of gravity variance is insignificant, as the rotation of the wheels does not affect the position of the center of gravity. The nature of the leg movement of the cattle gives rise to a center of gravity variance which will be much larger than that of the vehicle.

The classification of the object in the video surveillance is done by a logic in which the ratio of average height to width of the object is compared with the value one and variance in center of gravity is compared with a predetermined threshold value. The logic used while taking decision about the classification of the object captured in the silhouette image is as below:

Decision Logic

If H/W>1 and CG Variance>Threshold
Decision—HUMAN 'SILHOUETTE'
If H/W<1 and CG Variance>Threshold Decision—CATTLE 'SILHOUETTE'
If H/W<1 and CG Variance<Threshold Decision—VEHICLE ('SILHOUETTE' or 'NON-SILHOUETTE')
If H/W>1 and CG Variance<Threshold Three possibilities:
HUMAN—NON-SILHOUETTE
CATTLE—NON-SILHOUETTE
VEHICLE—NON-SILHOUETTE
This particular camera based system withdraws from decision process.
Where,
H/W=average height to width ratio
CG Variance=variance in the center of gravity In accordance with the FIG. 3, after the computation of the average height to width ratio as shown in step 104, the average height to width ratio is compared with numerical value 1 as shown in step 106. The variance in the center of gravity is compared with predetermined threshold value as given in step 108 and 110. If the average height to width ratio is greater than 1, in other words if average height of the object is greater than the average width and the variance in the center of gravity is greater than predetermined threshold, the object is classified under human category as per step 112. Likewise the object is classified as cattle as shown in step 116 if the average height is less than average width and variance of center of gravity is greater than predetermined threshold value and the object is classified as a vehicle as shown in step 118 if the average height is less than average width and variance of center of gravity is less than predetermined threshold value. If the average height is greater than average width and variance in the center of gravity less than predetermined threshold value then the system for classifying moving objects while video based surveillance withdraws from the decision process for classifying the moving object as shown in the step 114.

In order to test the invention, MPEG2 Videos were used. Every thirtieth frame of the MPEG2 video is fed for computation. The $n^{th}$ frame referred herein is actually the $30n^{th}$ frame of the original MPEG2 video. The invention has been tested with regards to calculation of variance in center of gravity (C.G. variance) for various moving objects are as given below:

EXAMPLE 1

Human (Walking)

Figure 4A:
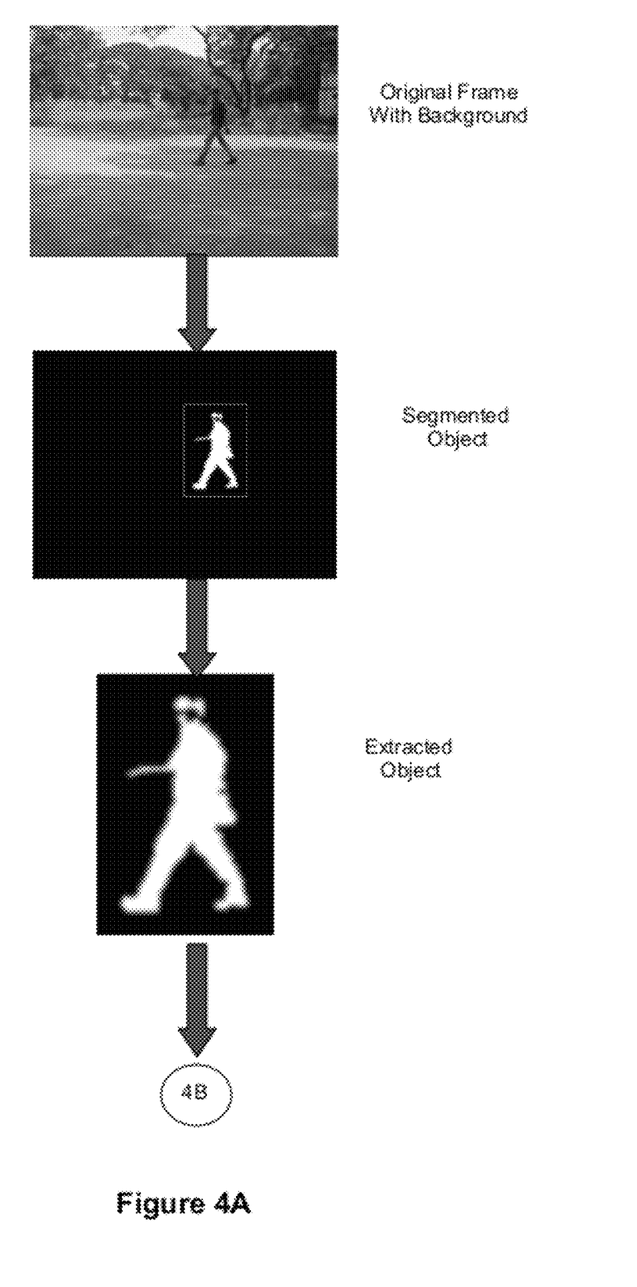
FIGS. 4A-4C illustrate the classification of a moving object during video-based surveillance.
Figure 4B:
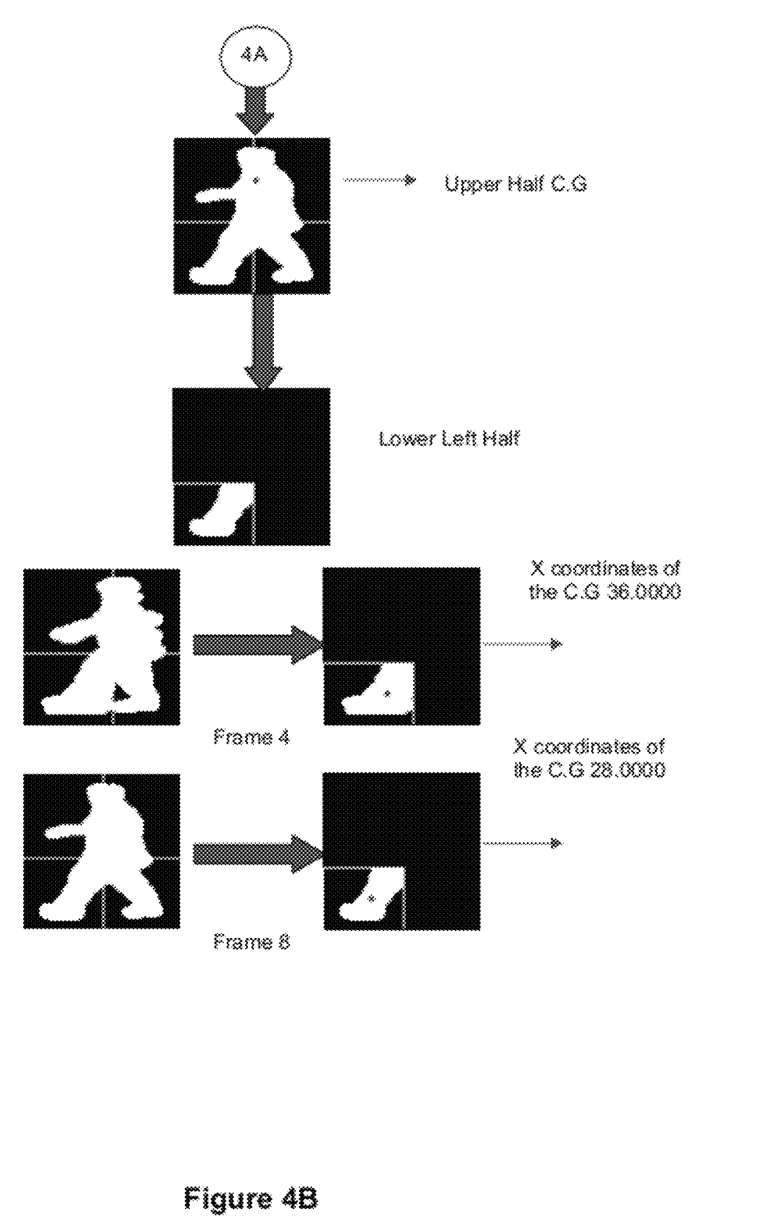
Figure 4C:
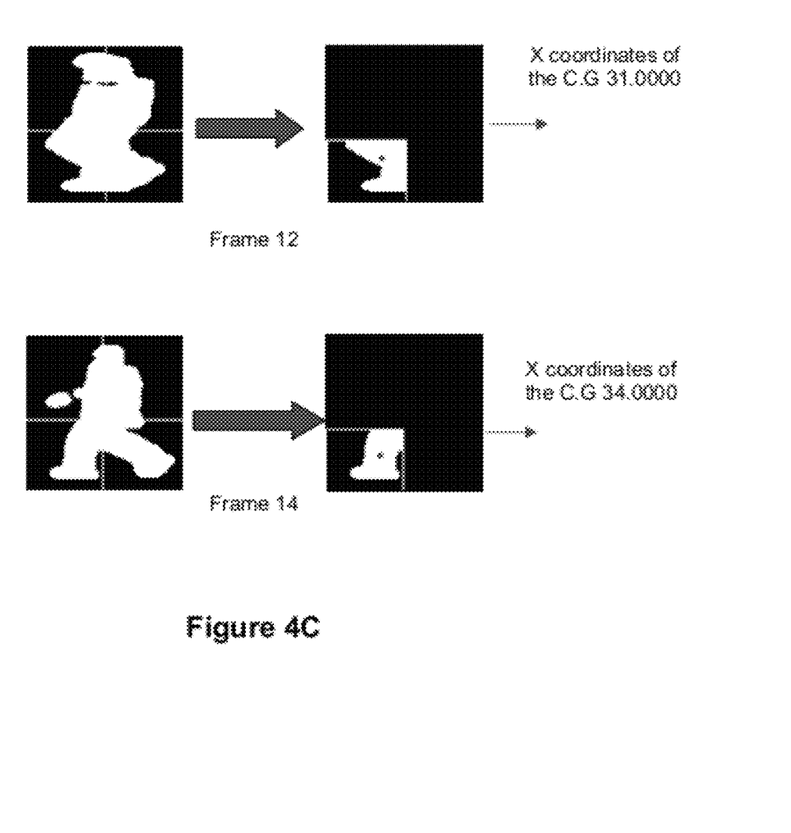

As shown in FIGS. 4A-4C, the system for classifying moving objects during video based surveillance is tested. A man is allowed to walk through the operating range of the video surveillance. The original frame with background is captured via video capturing means. The object is segmented and extracted from the captured frame. The extracted object is divided in to two parts namely an upper half and a lower half. Considering the upper half of the image, the CG is calculated and a vertical line passing through CG divides the lower half into two parts, namely a lower left half and a lower right half. Considering the lower left half of the extracted object, the variance of the part of the object, which is resided in the lower left half, from the vertical line passing through CG is calculated. Similarly, 16 consecutive frames are analyzed for the calculation of variance in center of gravity. In this particular example the C.G variance computation for consecutive 16 frames is 16.4000.

EXAMPLE 2

Moving Two Wheeler (Vehicle)

Figure 5A:
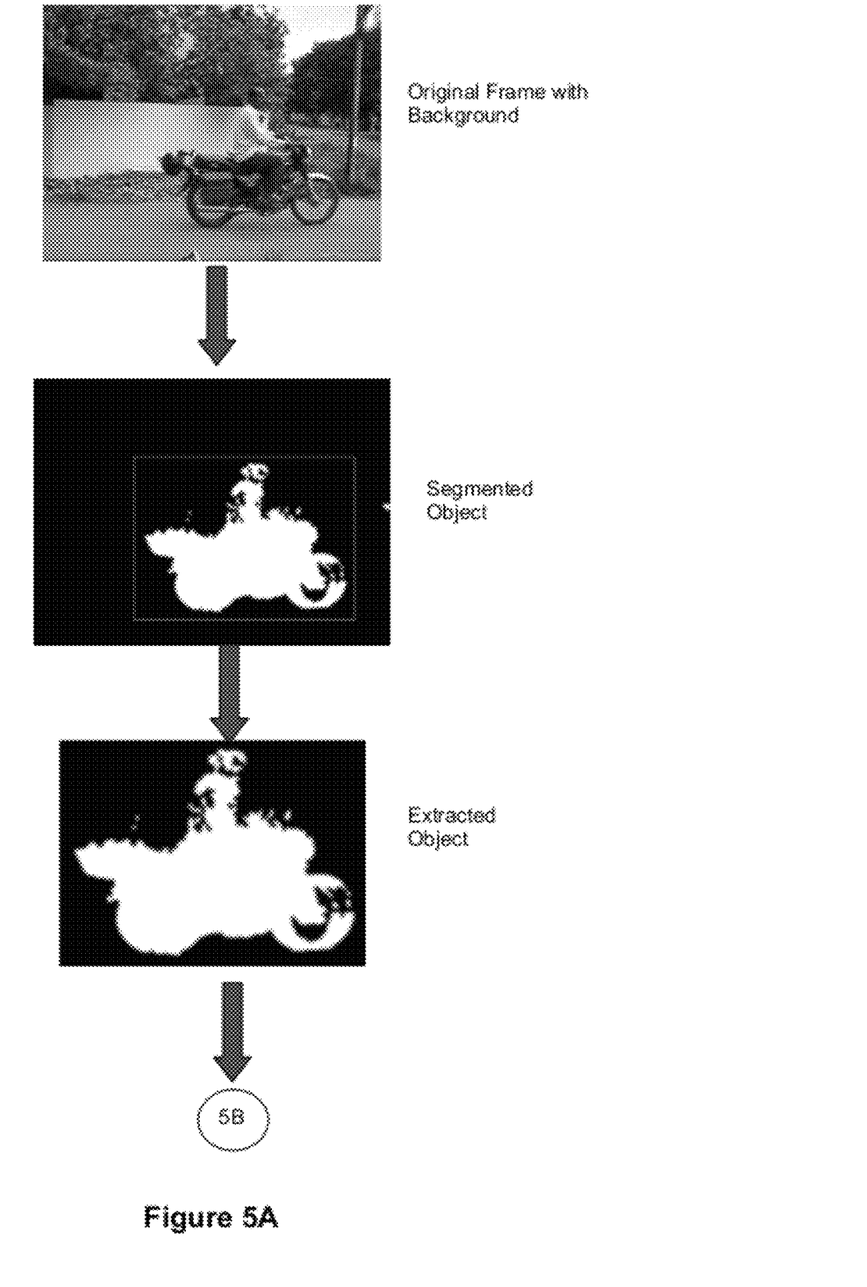
FIGS. 5A-5C illustrates a classification process for a moving two-wheeler vehicle undergoing video surveillance.
Figure 5B:
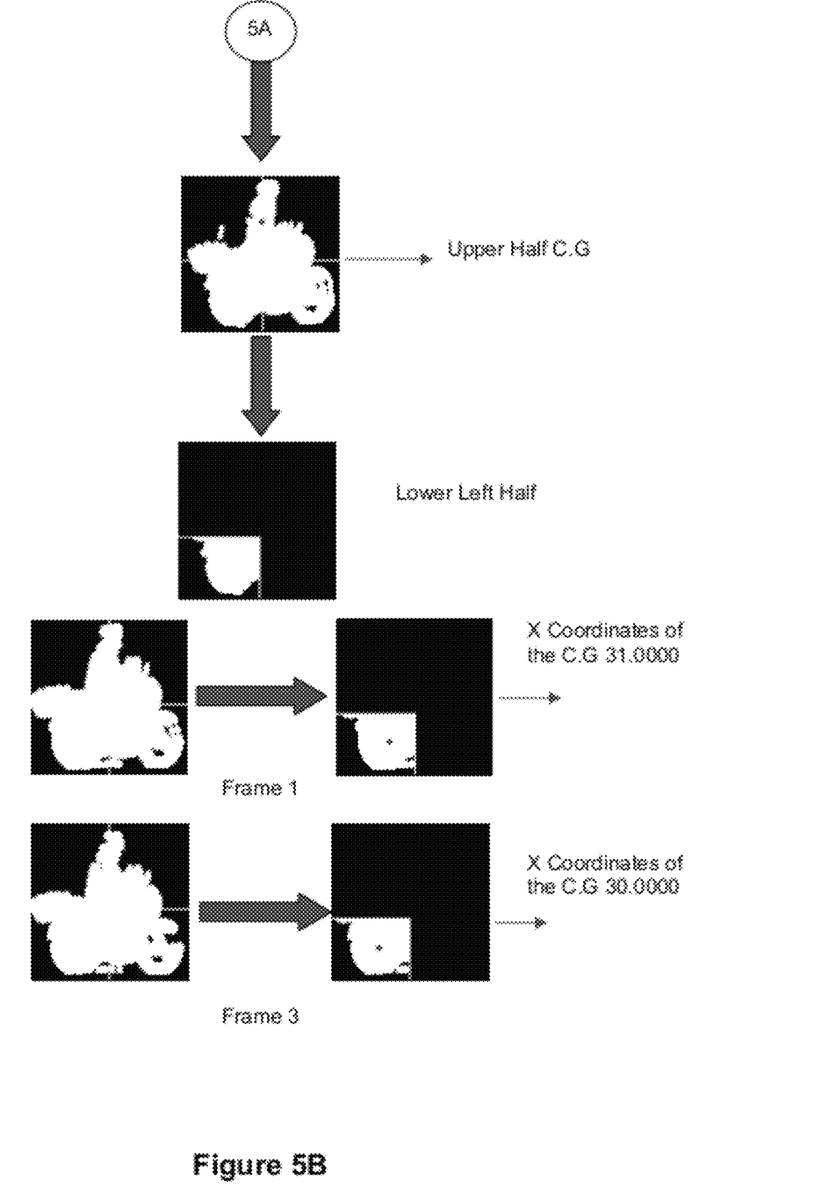
Figure 5C:
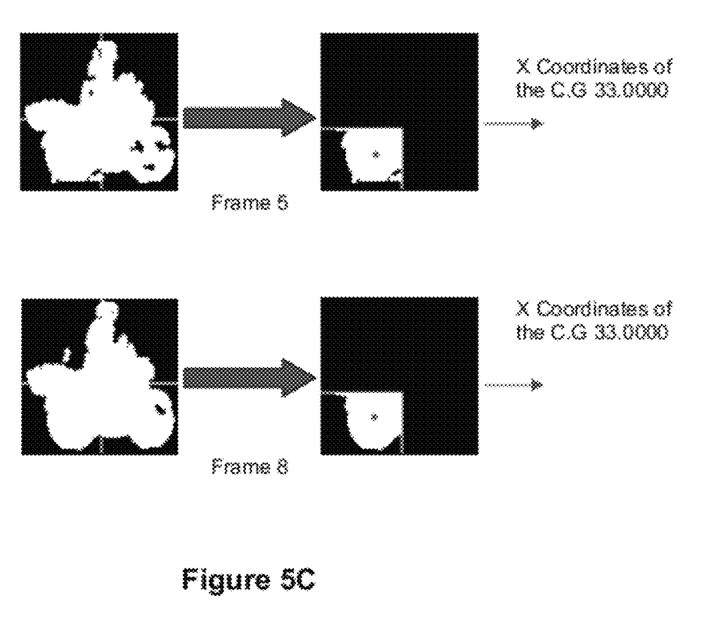

While analyzing the moving two-wheeler (vehicle) in the range of video surveillance as shown in FIGS. 5A-5C, following the same procedure as explained in the 1st example, 16 consecutive frames are analyzed. In this particular case the C.G variance computation for consecutive 16 frames is 1.6100.

EXAMPLE 3

Moving Car (Vehicle)

Figure 6A:
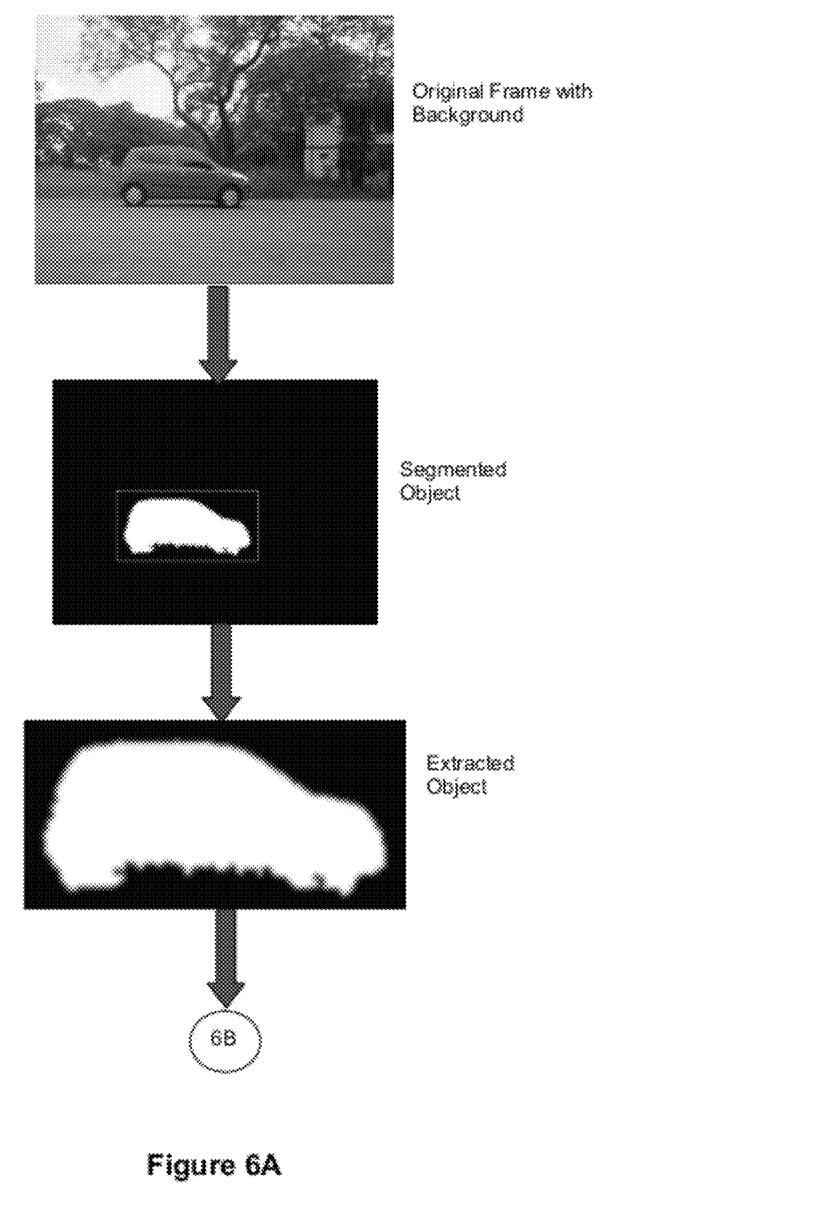
FIGS. 6A-6C illustrates a classification process for a moving vehicle undergoing video surveillance.
Figure 6B:
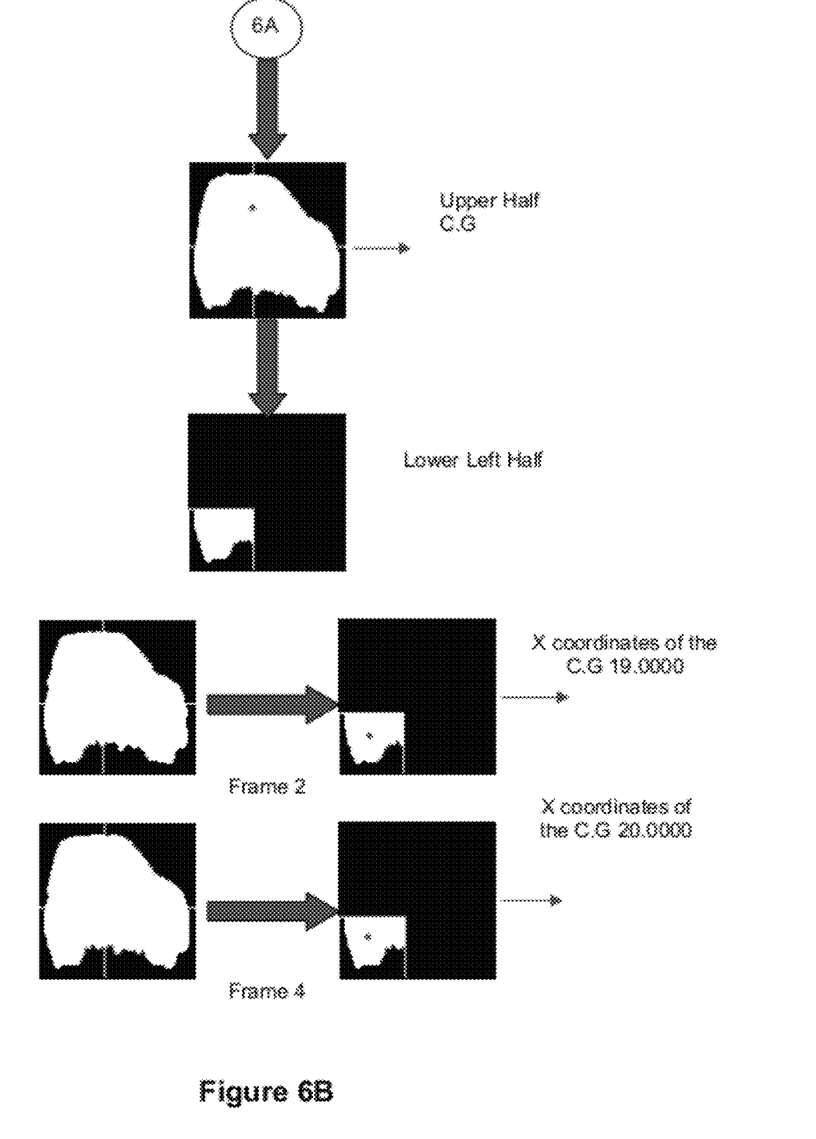
Figure 6C:
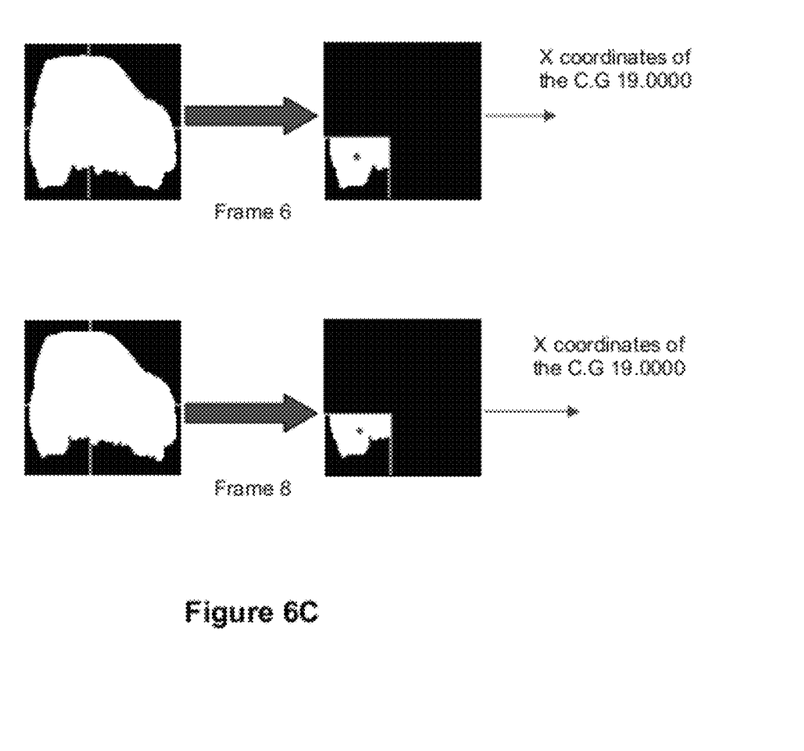

While analyzing the moving car in the range of video surveillance as shown in FIG. 6A-6C, following the same procedure as explained in the $1^{st}$ example, 16 consecutive frames are analyzed. In this particular case the C.G variance computation for consecutive 16 frames is 0.2400.

ADVANTAGES

The present application provides a system for classifying moving objects during video based surveillance in which only the set of center of gravities computed from a sequence of frames has to be stored for variance computation. There is no necessity to store the object images from a sequence of frames. Hence saving memory space of the video surveillance system.

The present application uses less complicated logic for the classification of the moving object during video surveillance.

The present application is computationally inexpensive.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A system for classifying a moving object during a video-surveillance, the system comprising:
    a video capturing device configured to capture a silhouette image frame of a video of the moving object in an operating range of the video capturing device; and
    a memory that stores instructions;
    a processor that executes the instructions to perform operations comprising:
        dividing the silhouette image frame into an upper half and a lower half;
        calculating a resizing scale factor using dimensions of the upper half of the silhouette image frame;
        resizing the silhouette image frame by applying the resizing scale factor that facilitates a resized silhouette image frame;

computing an average height of the moving object and an average width of the moving object in the resized silhouette image frame;

computing a center of gravity of the moving object in the resized silhouette image frame, wherein the center of gravity is computed based on the upper half of the silhouette image frame;

dividing the lower half of the silhouette image frame into two parts comprising a lower left half (LLH) and a lower right half (LRH), wherein the lower half is divided by using a vertical line passing through the center of gravity;

calculating a variance of the center of gravity based on consecutive frames of the silhouette image frame corresponding to change in one of the two parts of the lower half with respect to the center of gravity;

comparing the average height of the moving object with the average width of the moving object;

comparing the variance of the center of gravity with a predetermined threshold value; and classifying the moving object in the silhouette image frame into a predetermined class based on the comparison of the average height of the moving object with the average width of the moving object, and comparison of the variance of the center of gravity with the predetermined threshold value.

2. The system of claim 1, wherein the video capturing device comprises a video camera, a closed-circuit television camera, or an internet protocol camera.

3. The system of claim 1, wherein the video capturing device is configured for classifying the moving object during video surveillance.

4. The system of claim 1, wherein the video capturing device is capable of giving a decision for classifying the moving object in the silhouette image frame.

5. The system of claim 1, wherein the moving object is classified as a human if the average height of the moving object is greater than the average width of the moving object and the variance of the center of gravity is greater than the predetermined threshold value.

6. The system of claim 1, wherein the moving object is classified as a cattle if the average height of the moving object is less than the average width of the moving object and the variance of the center of gravity is greater than the predetermined threshold value.

7. The system of claim 1, wherein the moving object is classified as a vehicle if the average height of the moving object is less than the average width a of the moving object and the variance of the center of gravity is less than the predetermined threshold value.

8. The system of claim 1, wherein the video capturing device does not classify the moving object when the silhouette image frame of the moving object is not captured.

9. The system of claim 1, wherein the system does not classify the moving object when the average height of the moving object is greater than the average width of the moving object and the variance of the center of gravity is less than the predetermined threshold value.

10. The system of claim 1, wherein the system is configured to sound an alarm upon detection of an object of interest in the operating range of the video capturing device.

11. A method for classifying a moving object during a video surveillance, the method comprising:

capturing, by a processor, a silhouette image frame of a video of the moving object in an operating range of the video surveillance using a video capturing device;

dividing the silhouette image frame into an upper half and a lower half;

calculating a resizing scale factor using dimensions of the upper half of the silhouette image frame;

resizing the silhouette image frame by applying the resizing scale factor that facilitates a resized silhouette image;

computing an average height of the moving object and an average width of the moving object in the resized silhouette image frame;

computing, by the processor, a center of gravity of the moving object in the resized silhouette image frame, wherein the center of gravity is computed based on the upper half of the silhouette image frame;

dividing the lower half of the silhouette image frame into two parts comprising a lower left half (LLH) and a lower right half (LRH), wherein the lower half is divided by using a vertical line passing through the center of gravity;

calculating a variance of the center of gravity based on consecutive frames of the silhouette image frame corresponding to change in one of the two parts of the lower half with respect to the center of gravity;

comparing the average height of the moving object with the average width of the moving object;

comparing the variance of the center of gravity with a predetermined threshold value; and classifying the moving object in the silhouette image frame into a predetermined class based on the comparison of the average height of the moving object with the average width of the moving object, and comparison of the variance of the center of gravity with the predetermined threshold value.

12. The method of claim 11, wherein the video capturing device comprises a video camera, a closed-circuit television camera, or an internet protocol camera.

13. The method of claim 11, wherein the video capturing device is configured for classifying the moving object during video surveillance.

14. The method of claim 11, wherein the video capturing device is capable of giving a decision regarding classification of the moving object captured in the silhouette image frame.

15. The method of claim 11, wherein the moving object is classified as a human if the average height of the moving object is greater than the average width of the moving object and the variance of the center of gravity is greater than the predetermined threshold value.

16. The method of claim 11, wherein the moving object is classified as a cattle if the average height of the moving object is less than the average width of the moving object and the variance of the center of gravity is greater than the predetermined threshold value.

17. The method of claim 11, wherein the moving object is classified as a vehicle if the average height of the moving object is less than the average width of the moving object and the variance of the center of gravity is less than the predetermined threshold value.

18. The method of claim 11, wherein the video capturing device withdraws from classifying the moving object when the silhouette image frame of the moving object is not captured.

19. The method of claim 11, wherein the moving object is not classified when the average height of the moving object is greater than the average width of the moving object and the variance of the center of gravity is less than the predetermined threshold value.

20. The method of claim 11, further comprising sounding an alarm upon detection of an object of interest in the operating range of the video capturing device.

21. The system of claim 1 further configured to store a plurality of centers of gravity for variance computation, wherein the plurality of centers of gravity are computed from a sequence of frames is stored, thereby obviating a need to store a plurality of images of the moving object.

22. The method of claim 11 further comprising storing a plurality of centers of gravity for variance computation, wherein the plurality of centers of gravity are computed from a sequence of frames is stored, thereby obviating a need to store a plurality of images of the moving object.

\* \* \* \* \*